Figure 1:
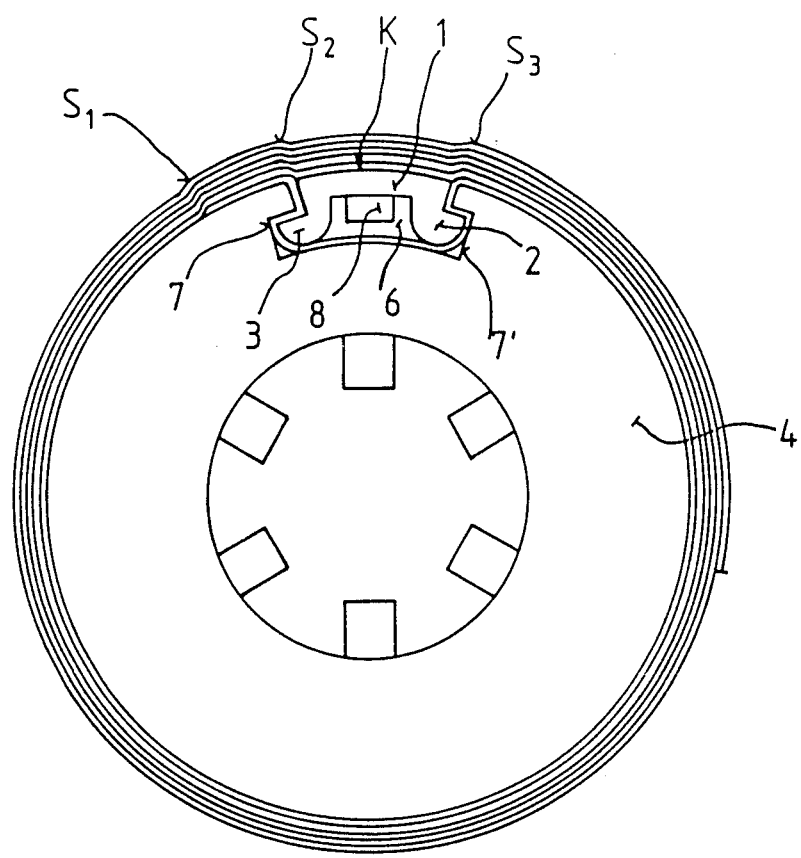

United States Patent [19]

Schoettle et al.

[11] Patent Number: 4,750,683
[45] Date of Patent: Jun. 14, 1988

[54] TAPE CLAMP FOR A TAPE REEL WITH OR WITHOUT AT LEAST ONE FLANGE, AND TAPE REEL THEREFOR

[75] Inventors: Klaus Schoettle, Heidelberg; Kurt Schmidts, Kehl, both of Fed. Rep. of Germany

[73] Assignee: BASF Aktiengesellschaft, Ludwigshafen, Fed. Rep. of Germany

[21] Appl. No.: 23,382

[22] Filed: Mar. 9, 1987

[30] Foreign Application Priority Data

Mar. 8, 1986 [DE] Fed. Rep. of Germany ... 8606397[U]

[51] Int. Cl.⁴ .............................................. B65H 75/28
[52] U.S. Cl. ................................................ 242/74.1
[58] Field of Search ..................... 242/74, 74.1, 74.2, 242/125.1

[56] References Cited

U.S. PATENT DOCUMENTS

| | | | |
|---|---|---|---|
| 3,195,828 | 7/1965 | Kuckhoff et al. | 242/74.1 |
| 3,661,345 | 5/1972 | Ritz et al. | 242/74.1 |
| 4,213,578 | 7/1980 | Katata | 242/74 |
| 4,341,358 | 7/1982 | Shoji | 242/74.1 |
| 4,436,253 | 3/1984 | Watanabe | 242/74.1 |

FOREIGN PATENT DOCUMENTS

| | | |
|---|---|---|
| 0136504 | 4/1985 | European Pat. Off. . |
| 2100889 | 9/1972 | Fed. Rep. of Germany . |
| 7521898 | 10/1975 | Fed. Rep. of Germany . |

Primary Examiner—John M. Jillions
Attorney, Agent, or Firm—Keil & Weinkauf

[57] ABSTRACT

A hub/tape clamp arrangement for tape-like or strip-like articles consists of a recess in the peripheral edge of the hub, having one or more middle projections, and a tape clamp having the shape of an inverted W. In practice, wedge-shaped locking means between the projection and/or walls of the recess and the tape clamp may serve to retain the clamp and fix the tape. Steps at the ends of the recess, and extensions or steps in the hub recess which have been matched up in shape, increase the possibilities for monitoring/measuring dimensions. If the tape is fastened asymmetrically on one side, the tape clamp rises out of the recess on one side by a distance precisely the same as the tape thickness, so that the tape emerging from the recess is wound at the same level, i.e. the empty hub has a roughly screw-shaped peripheral contour. The hub can be designed for use with or without one or more flanges and is particularly useful for thin tapes, e.g. magnetic tapes.

11 Claims, 3 Drawing Sheets

TAPE CLAMP FOR A TAPE REEL WITH OR WITHOUT AT LEAST ONE FLANGE, AND TAPE REEL THEREFOR

The present invention relates to a tape clamp for a tape reel with or without at least one flange, clamp locking elements on the tape clamp interacting, as holding elements, with hook elements in a recess in the hub in order to hold the clamp in the recess, and tape locking elements fixing the tape end, and at least one projection, which is located on the hub and projects roughly into the middle of the recess, serving to support the middle part of the tape clamp, and a tape reel therefor.

Tape clamps of this type are used for tape-like or strip-like articles, for example recording media, when these are to be wound onto tape reels which have one or two flanges or are flangeless, i.e. reel hubs or hubs, and one or both ends of the article are to be fastened to the reel or to the hub.

German Laid-Open application DOS No. 2,901,383 discloses a U-shaped tape clamp whose middle part is supported on a central projection in the hub recess and whose leg parts have oval or elliptical clamping parts for clamping between the middle part and the end walls of the recess. The manufacture and assembly of the tape clamp and the production of the recess are complicated and are not very suitable for mass production.

German Utility Model No. 7,521,898 discloses a tape clamp, having a roughly inverted W-shape, in an edge recess of a flangeless hub, the middle leg not, however, being used for support, since it does not extend as far as the bottom of the recess. There is furthermore no central projection in the recess. The outer legs of the clamp end in roughly wedge-shaped clamps which engage end grooves of the recess. The shapes of the tape clamp and of the recess do not fit together tightly at the periphery, resulting in two troublesome areas where the edge is interrupted, so that impressions are inevitably left on the tape.

U.S. Pat. No. 3,661,345 discloses a flangeless hub having an edge recess and a tape clamp which is inseparably connected to the hub, the tape clamp possessing a middle leg which, in the closed position, engages between two central projections in the recess. Furthermore, only one outer fastening leg is present. This embodiment has a great disadvantage in that the tape clamp may expand in length, so that smooth closure of the outer edge is no longer ensured. A tape clamp, once deformed, cannot be replaced without disadvantages.

Because of substantial production tolerances of the known tape clamps, possibly in conjunction with fluctuations in the thickness of the leader tape of the magnetic tape, impressions may be left on the tape and the latter may be damaged in other ways.

It is an object of the present invention to improve the known tape clamps also in respect of a simplified clamping process, and to provide an improved reel hub.

We have found that this object is achieved, according to the invention, by a tape clamp for a tape reel with or without at least one flange, clamp locking elements on the tape clamp interacting, as holding elements, with hook elements in a recess in the hub in order to hold the clamp in the recess, and tape locking elements fixing the tape end, and at least one projection, which is located on the hub and project roughly into the middle of the recess, serving to support the middle part of the tape clamp, if the tape clamp has an inverted W shape and at least one of the outer legs of the W shape clamp has locking elements which form holding elements and tape locking elements together with said at least one of the hook-elements in the recess.

By supporting the tape clamp centrally, lengthening of the clamp in the peripheral direction of the reel hub can advantageously be achieved, so that the ends of the clamp can be lengthened, for example compared with the known clamp embodiments. Because of the usual resilience of the tape clamp material, the ends of the clamp are urged against the hub periphery, thus avoiding troublesome areas at the peripheral edge.

It is advantageous if the tape clamp can be separated from the hub, since it is then also easy to replace/change.

In practice, the middle leg of the tape clamp extends at least as far as the projection in the recess, so that support is in any case ensured.

With two symmetrically arranged projections in the recess, it is also possible to provide a middle leg in such a way that it projects between the projections, permitting additional locking.

Advantageously, undercut grooves having a wedge-shaped cross-section are provided in one or more middle projections and/or in the end walls of the recess, affording additional fastening facilities for the tape clamp.

In another embodiment of the tape clamp, the W-shaped part possesses an arc-shaped middle section and the legs, and the said middle section is provided with extensions which project beyond the outer leg parts, are, in particular, arc shaped and essentially have a constant thickness.

This provides a good method of checking the dimensional accuracy of the tape clamps and avoids problems at the circular edge contour of the hub.

In an advantageous embodiment for hubs having two middle projections in the recess, the outer clamp legs are provided with inward-projecting locking lugs, and in a further embodiment the locking lugs may have wedge-shaped cross-sections. This opens up further possibilities for secure fastening of the clamp and fixing of the tape.

For hubs which possess a recess having undercut grooves in the end walls, the outer clamp legs are provided with outward-projecting locking lugs, and the latter may possess a wedge-shaped cross-section. This provides further fastening and fixing facilities which may also readily be combined with one another.

In a practical embodiment, the wedge angle of the undercuts of the recess may be larger, in particular from about 5° to about 15° larger, than the wedge angle of the associated locking lugs on the clamp legs.

In conjunction with the novel tape clamp, the invention also relates to the associated hubs whose recesses, in order to accept the particular type of tape clamp, also have to meet various three-dimensional preconditions, and which therefore play an important role in the embodiment capable of functioning.

The hub, with or without at least one flange, for a novel tape clamp possesses a recess in the peripheral edge, the said recess being provided with at least one middle projection and/or elements for locking lugs on the tape clamp, and the end walls of the recess each have a step for supporting the tape clamp, with arc-shaped projections, in particular of constant height.

This provides a secure hub embodiment, and tape, in particular thin magnetic tape, can be fastened or wound around the said hub embodiment without damage.

The invention is illustrated by embodiments which are described below and shown in the drawing.

Figure 4:
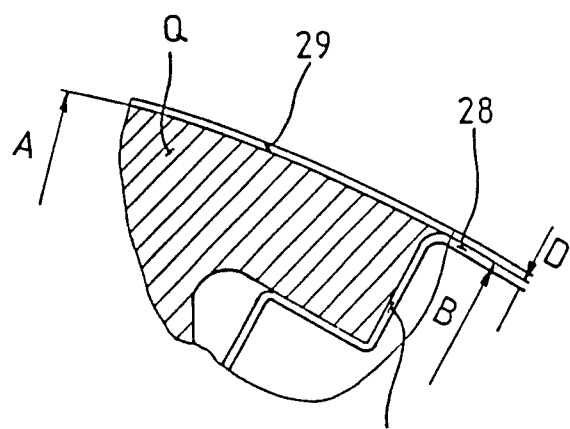
Figures 2, 2A:
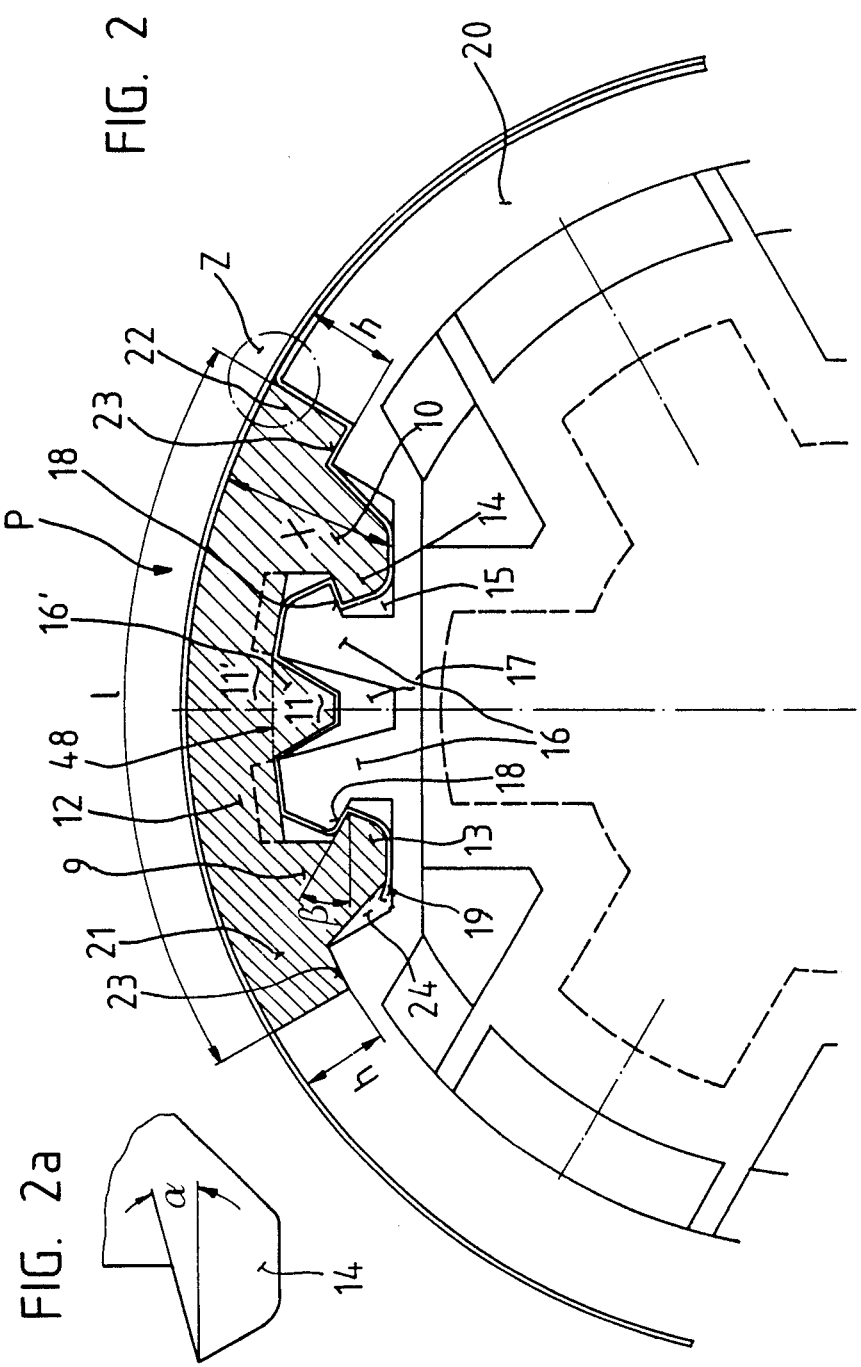
Figure 3:
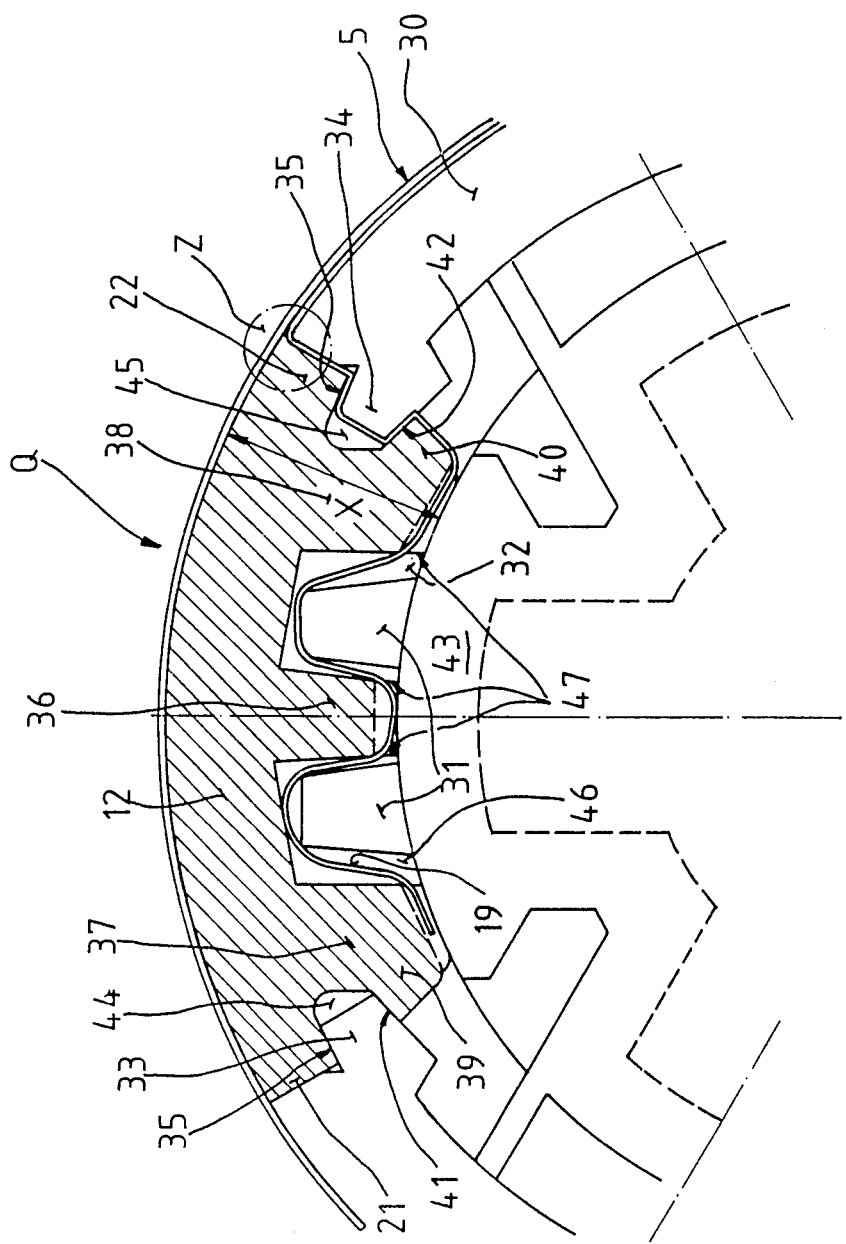

FIG. 1 shows a hub for magnetic tape cassettes,
FIG. 2 shows a first embodiment of the tape clamp,
FIG. 2a shows a detail from FIG. 2,
FIG. 3 shows a second embodiment of the tape clamp, and
FIG. 4 shows the detail Z from FIG. 3.

In hubs for magnetic tape cassettes, a magnetic tape 5 is wound around a hub 4, and the end of the magnetic tape has to be fastened to the hub 4 in a secure manner and without impairing functioning. A large number of different clamps are known for this purpose, these clamps frequently having an omega shape, as shown in FIG. 1, and being capable of being hooked into appropriate grooves 7, 7' of hub 4 by means of two hook ends 2, 3. In general, hook ends 2, 3, together with the middle part 1 of clamp K which closes the peripheral recess 6 of hub 4, are designed so that their tangential dimension together with the tape is somewhat larger than the recess 6, so that the clamp K is jammed in recess 6 under a certain tension and holds the magnetic tape 5 securely. 8 denotes a middle leg within the U opening of the tape clamp, this leg being intended to increase the stability of the clamp. Such hubs 4 and clamps K are manufactured in large numbers from plastic and generally assembled on automatic machines. In this context, the known tape clamp embodiment K has a number of disadvantages. On the one hand, where production volumes are large, the hubs and clamps originate from a plurality of injection molds, resulting in large tolerance ranges. Consequently, parts which in terms of tolerance do not fit well together inevitably come together in the automatic assembly machines, and this problem is exacerbated by the fact that magnetic tape or the leader tape may vary in thickness. If, for example, the clamp is too small in relation to the hub recess, the tape cannot be fastened securely and can readily be pulled out of the hub. However, the converse case of an excessively large clamp is also disadvantageous, since in this case the middle part 1 of the clamp K curves and does not conform to the cylindrical shape of the peripheral surface of the hub and has an adverse effect on rotation of the hub.

Problems with rotation and additional impressions on the magnetic tape far into the tape roll also occur in the case of conventional clamps K because the clamped tape end produces a step in the thickness of the tape at the entrance and exit S2 and S3, respectively of the hub recess, and at the free tape end S1. Moreover, because of the tolerances, the tape is frequently clamped in a slightly inclined position, which again may lead to a step in the roll periphery or to the projecting layers running against the cassette housing until the roll jams. The novel tape clamps are shown in FIGS. 2 and 3. The tape clamp P essentially consists of the W-shaped clamp part having the arc-shaped part 12 and leg parts 9 and 10, as well as the middle leg 11. Both legs 9 and 10 are provided with tape-locking elements 13 and 14, which essentially consist of locking lugs 13 and 14 which have wedge-shaped ends.

The hub 20, for use with or without at least one flange, possesses at the periphery a recess 15 which has a double projection 16 in the middle with a central depression 17. The opening of the central depression 17 corresponds roughly to the dimensions of the foot of the middle leg 11 of tape clamp P or is somewhat larger than the foot. The double projection 16 has locking edges 18 on each side, which, in relation to the bottom of the recess 15, are directed upwards roughly at an angle $\beta$ of from 10° to 40°, in particular about 25°. The wedge angle $\alpha$ of the locking lugs 13 and 14 should be chosen to be about 5°–15° smaller than $\beta$. In FIG. 2a, an angle $\alpha$ of about 15° is shown. Such dimensions result in mutual wedging of locking edges 18 of the projection and locking lugs 13 and 14, and the fastening tape end or leader tape end 19 in between is likewise adequately wedged.

In FIG. 2 the legs 9 and 10 extend roughly to the bottom of recess 15. The length X of the legs (after wedging or pressing together of the plastic material) must correspond relatively exactly to the radial depth of the recess minus the thickness D of the fastening tape end or leader tape end.

The length L of the tape clamp is equal to the length l of the edge contour of the recess 15 minus the tape thickness D $$L = L - D,$$

when the tape 5 is fastened only on one side of the clamp, which is advantageous in practice if one or more further steps are to be avoided.

The tape clamps P and Q have arc-shaped projections 21, 22 which, in the case of P, extend the clamp beyond the legs 9 and 10 and, as shown, have a constant height h. For the projections 21, 22, a step 23 is provided whose radial height, measured from the periphery, may likewise be h, so that the projections 21, 22 rest on this step. If the fastening tape or leader tape 5 is fixed between step 23 and projection 22 (or 21), the end edge of the particular projection is a tape thickness D above the end of the recess 15 (cf. FIG. 4 and the detailed description below). However, it is also possible for the projections to have the shape of a circular segment, so that their thickness is no longer constant; in this case, the step may be arranged horizontally (i.e. as a horizontal secant relative to the hub periphery).

It can be seen from FIGS. 2 and 3 that the tape end 19 in each case comes to rest in a free space 24 in order as far as possible to avoid additional interference at the hub periphery. For this purpose, a sufficient number of free spaces 24 of adequate size are planned for in the shape of the tape clamp P or Q and the associated recess, in order also to permit fastening in different radial positions along the recess 15.

FIG. 3 shows a hub 30 possessing a pair of projections 31 a distance apart, a recess 32, end walls 33 and 34 and steps 35. The associated tape clamp Q differs in the following ways from tape clamp P (identical parts are denoted by the same numbers as in FIG. 2). The middle leg 36 is longer and extends virtually to the bottom of recess 32. Legs 37 and 38 have outward-projecting locking lugs 39, 40, which wedge against locking edges 41 and 42 of the end walls 33 and 34. The statements above apply to the wedge angle. The extension projections 21 and 22, which rest on steps 35, are located directly above.

In this embodiment, the recess 32 extends directly to the outer ring 43 of the hub 30, so that the clamp Q always automatically becomes oriented or fixed only on the outer ring region 43 of hub 30.

The tape clamp Q is provided, between the locking lugs 39, 40, with undercut grooves 44 and 45, wherein the lower edge, the locking edge 41 or 42, is wedge-shaped and runs tangentially with respect to the outer ring 43.

The drawing in FIG. 3 shows an instantaneous picture in the clamping process, during which the end of the fastening tape or leader tape 19 moves from the dashed position further towards the interior of the clamp. In the final position, the end piece 19 of the tape enters the free space 46 and, in this position, cannot produce impressions on the layers of tape. The lower edges of the legs 36, 37 and 38 of the W shaped part are represented by dashed lines in order to illustrate this instantaneous process; however, it is clear that, in the final position, the legs 36-38 are intended to press the tape 5 against the ring 43 of the hub 30, this being illustrated by means of radial, solid lines 47.

Regarding the dimensions of the novel clamp embodiments P and Q, the following should be noted. The height X of the legs 9 and 10 or 37 and 38 of the W-shaped part 8 is chosen to be equal to the depth of the recess 15 or 32, measured from the peripheral edge of the hub 10 or 30. The tape 5 anchored in tape clamp P or Q rests between the locking elements, locking lugs 14 or 40 and locking edges 18 or 42, and between the leg 11 or 36 and the bottom of the particular recess 15 or 32. The tape 5 thus comes into contact with the clamp only on one side and tips the clamp partially out of the recess 15 or 32, by an amount corresponding to the tape thickness D. The tape section emerging from the hub recess 15 or 32 thus has its outer surface exactly at the level of the peripheral surface of the tape clamp P or Q.

Hence, $$B = A + D,$$

where
- A is the height of the clamp P or Q in the particular recess,
- B is the height of the outer surface of the emerging tape section 28 above the bottom of the recess and
- D is the thickness of the end of the fastening tape or the leader tape.

The subsequent outer tape layer encounters a stepless lateral surface free of interference, so that impressions in this tape layer and in all subsequent tape layers owing to the tape clamp occur only to a very greatly reduced extent, if at all. For complete elimination, exact dimensions of recess and tape clamp in the peripheral direction are of course also essential.

For the above precision requirements in the case of conventional trailing/leader tapes of from 20 to about 50 μm, it is necessary for the hub and its recess to be produced by volume production, which nevertheless gives an exact fit. The proposed tape clamp embodiments therefore have a three-dimensional shape which makes it easy to check the fit dimensions on the tape clamp and in the recess.

Both the embodiment of the ends of the recesses 15 and 32 as steps 23 or 35 (for example with a height h) and the form of the extension projections 21 and 22 (for example with a thickness corresponding to the height h) permit trouble-free easy measurement and checking of the clamps and of the recess in the hubs, during and after manufacture. Hence, problems which may arise after tape fastening can be excluded from the outset. Even when the projections have the shape of a circular segment for which the thickness is not constant, at least the step dimensions and distances can advantageously be measured.

The assembly process for cassette manufacture is as follows:

The clamps are automatically fed and pressed, with the (fastening/leader) tape end to be fastened, into the recess. The tape length is then wound onto the hubs by means of suitable winding apparatuses, after which the tape and hub are inserted into open cassette housings. All operations can be carried out completely automatically.

The above description assumed the presence of pairs of projections 16 and 31. It is of course quite possible, as indicated by the dashed line 48 in FIG. 2, to replace the double projections 16 by a single projection (cf. the line connecting the end lines between the individual projections 16) and, because of this, to reduce the middle leg 11 to a stump 11', which then rests on the middle of the projection 16', which in this case is a single projection.

Whereas the function of the wedge-shaped middle leg 11 was to force the two individual projections 16 apart in order to increase the locking effect at the locking edges 18 and locking lugs 13, 14, a stump 11' can merely exert a compressive force on the single projection 16', so that a purely supportive effect is obtained.

Because of the simplified and improved tape clamp embodiments, it is possible in practice for the tape clamps and hubs to be produced in a more economical manner and the clamping process to be simplified. Moreover, the quality of the cassettes produced can be improved because it is possible substantially to reduce the number of rejects obtained as a result of impressions being made in the tape.

The tape clamp material, e.g. polyoxymethylene (POM) or the like, should have a resilience close to its elastic limit (i.e. just before the point at which plastic deformation occurs), so that the dimensions too, particularly those relating to the artificially produced tape thickness step (FIG. 4), do not change when the hub is under pressure from a full roll. Hence, the tape clamp should also consist of a single material having a single modulus of elasticity in order to be able to ensure that this dimensional accuracy is of the order of magnitude of the thickness of a fastening/leader tape of about 20-50 μm. The tolerances of the recess and of the tape clamp have the required precision when conventional production methods are used.

We claim:

1. A tape clamp for anchoring one end of a tape in a tape reel having a hub with or without flanges,
    said hub having a recess with undercuts therein and having two projections which extend generally radially outwardly into the central area of said recess and support the central portion of the tape clamp,
    said tape clamp being in the shape of an inverted W and having a central leg designed to extend between said projections, and, symmetrically with respect to said central leg, two peripherally outer legs with holding elements which engage said undercuts for holding said clamp in said recess.

2. A tape clamp as claimed in claim 1, which is separable from the hub.

3. A tape clamp as claimed in claim 1, wherein the central leg of the W-shaped clamp extends at least as far as the projections in the recess.

4. A tape clamp as claimed in claim 1, wherein the W-shaped clamp has a radially outer portion from which the central leg and the peripherally outer legs extend, said radially outer portion having an arc-shaped periphery and peripheral extension beyond the outer legs, and being essentially of constant thickness.

5. A tape clamp as claimed in claim 1, wherein the holding elements of said outer legs are in the form of locking lugs formed with a wedge-shaped cross-section having a wedge angle which is designed to cooperate with a wedge surface in said undercuts.

6. A tape clamp as claimed in claim 2, wherein the wedge angles on said locking lugs are about 5° to 15° smaller than the wedge angles of the associated undercut surfaces of the recess.

7. A tape clamp as claimed in claim 2, wherein said locking lugs extend peripherally inwardly and are designed to cooperate with wedge surfaces in undercuts provided in said two projections of the hub.

8. A tape clamp as claimed in claim 2, wherein said locking lugs extend periperhally outwardly and are designed to cooperate with wedge surfaces of undercuts in the end walls, viewed peripherally, of said recess.

9. A hub for use with a tape clamp as claimed in claim 1, wherein the end walls, viewed peripherally of the recess, each have a step for supporting the peripheral extensions of the tape clamp.

10. A hub as claimed in claim 9, wherein said peripheral extensions have an arc-shaped periphery and a constant height.

11. A tape clamp as claimed in claim 1, wherein the length of the outer clamp legs is essentially equal to the depth of the recess of the hub so that, when the end of the fastening tape is fixed by one of the outer clamp legs in the operating position of the clamp in the recess, one upper edge of the tape clamp projects above the arc-shaped contour of the hub by the particular thickness of the fastening tape.

* * * * *